United States Patent
Kitagawa et al.

(10) Patent No.: US 10,450,931 B2
(45) Date of Patent: Oct. 22, 2019

(54) EXHAUST GAS CONTROL APPARATUS FOR INTERNAL COMBUSTION ENGINE

(71) Applicant: TOYOTA JIDOSHA KABUSHIKI KAISHA, Toyota-shi, Aichi-ken (JP)

(72) Inventors: Kensuke Kitagawa, Susono (JP); Akira Yamashita, Sunto-gun (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 287 days.

(21) Appl. No.: 15/645,279

(22) Filed: Jul. 10, 2017

(65) Prior Publication Data

US 2018/0016961 A1  Jan. 18, 2018

(30) Foreign Application Priority Data

Jul. 14, 2016 (JP) ................. 2016-139242

(51) Int. Cl.
| | |
|---|---|
| *F01N 9/00* | (2006.01) |
| *F01N 3/025* | (2006.01) |
| *F02B 37/00* | (2006.01) |
| *F02D 41/02* | (2006.01) |
| *F02D 41/40* | (2006.01) |

(Continued)

(52) U.S. Cl.
CPC ........... *F01N 9/002* (2013.01); *F01N 3/0253* (2013.01); *F01N 11/002* (2013.01); *F02B 37/00* (2013.01); *F02D 41/029* (2013.01); *F02D 41/1448* (2013.01); *F02D 41/405* (2013.01); *B01D 46/0063* (2013.01); *B01D 46/446* (2013.01); *B01D 2279/30* (2013.01); *F01N 2550/04* (2013.01); *F01N 2560/08* (2013.01); *F01N 2900/0416* (2013.01); *F01N 2900/0422* (2013.01); *F01N 2900/102* (2013.01); *F01N 2900/1406* (2013.01); (Continued)

(58) Field of Classification Search
CPC .... F01N 9/002; F01N 11/002; F01N 2550/04; F01N 2560/08; F01N 2900/0422; F02D 41/029; F02D 41/1448; F02D 2200/0812
USPC ......................................... 60/295
See application file for complete search history.

(56) References Cited

U.S. PATENT DOCUMENTS

2007/0044455 A1* 3/2007 Barasa ................ F01N 3/035
60/295
2013/0074481 A1* 3/2013 Miura ................ F02D 41/029
60/311

FOREIGN PATENT DOCUMENTS

| JP | 2003-161140 | 6/2003 |
|---|---|---|
| JP | 2004-36454 | 2/2004 |

(Continued)

*Primary Examiner* — Ngoc T Nguyen
(74) *Attorney, Agent, or Firm* — Finnegan, Henderson, Farabow, Garrett & Dunner, LLP

(57) ABSTRACT

A basic regeneration completion pressure difference value is set based on a predicted deposition amount of incombustible deposits produced steadily on a particulate filter, and a corrected regeneration completion pressure difference value higher than the basic regeneration completion pressure difference value is set based on a deposition amount of incombustible deposits deposited unsteadily on the particulate filter. After regeneration processing starts, when a time for which a pressure difference value is maintained to be equal to or greater than the basic regeneration completion pressure difference value after decreasing to the corrected regeneration completion pressure difference value exceeds a prescribed regeneration completion time, the regeneration processing ends.

6 Claims, 7 Drawing Sheets

(51) Int. Cl.
  *F01N 11/00*   (2006.01)
  *F02D 41/14*   (2006.01)
  *B01D 46/00*   (2006.01)
  *B01D 46/44*   (2006.01)

(52) U.S. Cl.
  CPC ................ *F01N 2900/1606* (2013.01); *F02D 2200/0812* (2013.01); *Y02T 10/144* (2013.01); *Y02T 10/47* (2013.01)

(56) References Cited

FOREIGN PATENT DOCUMENTS

| | | |
|---|---|---|
| JP | 2007-16684 | 1/2007 |
| JP | 2009-144518 | 7/2009 |

\* cited by examiner

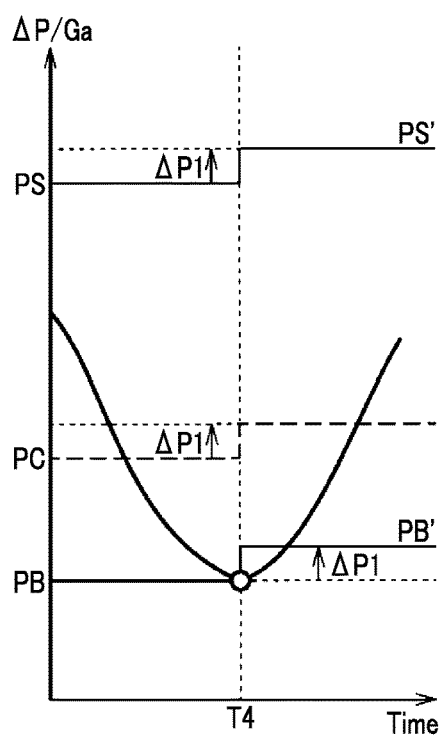
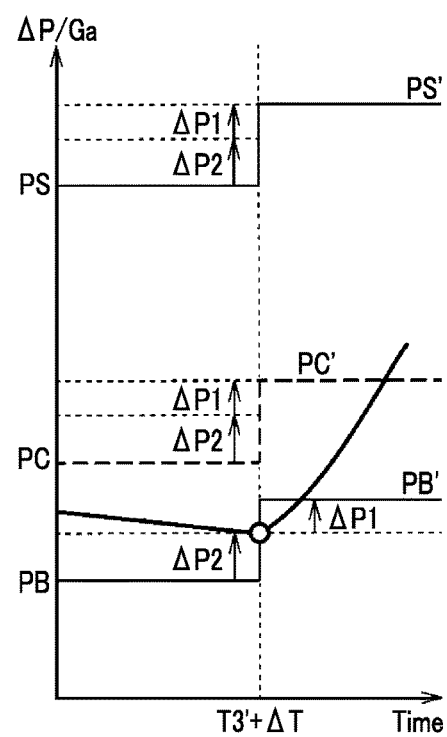
FIG. 4A
FIG. 4B

EXHAUST GAS CONTROL APPARATUS FOR INTERNAL COMBUSTION ENGINE

INCORPORATION BY REFERENCE

The disclosure of Japanese Patent Application No. 2016-139242 filed on Jul. 14, 2016 including the specification, drawings and abstract is incorporated herein by reference in its entirety.

BACKGROUND

1. Technical Field

The present disclosure relates to an exhaust gas control apparatus for an internal combustion engine.

2. Description of Related Art

In an internal combustion engine including a particulate filter for trapping particulates, such as soot, included in exhaust gas, when the amount of particulates trapped on the particulate filter increases, processing for heating the particulate filter to combust and eliminate the trapped particulates, that is, the regeneration processing of the particulate filter is performed. If the regeneration processing of the particulate filter starts, since the trapped particulates are gradually combusted and eliminated, a pressure difference before and after the particulate filter gradually decreases. Next, if the pressure difference value before and after the particulate filter detected using a pressure difference sensor or the like becomes equal to or less than a prescribed reference value, it is determined that most of the particulates are combusted and eliminated, and the regeneration processing of the particulate filter is stopped. Next, a trapping operation of particulates on the particulate filter starts again.

If the regeneration processing of the particulate filter is performed, ashes remain on the particulate filter. Ashes are cinders of engine oil mixed in fuel, and are generated, for example, in a combustion chamber of an internal combustion engine. The ashes generated in the combustion chamber of the internal combustion engine are moved to the particulate filter along with exhaust gas and are deposited without passing through the particulate filter. The ashes are not combusted even if the regeneration processing of the particulate filter is performed. For this reason, the amount of ashes on the particulate filter gradually increases over time. If the amount of ashes on the particulate filter increases, even though particulates, such as soot, are not trapped on the particulate filter, the pressure difference before and after the particulate filter increases. Accordingly, if a large amount of ashes is deposited on the particulate filter, the pressure difference value before and after the particulate filter does not decrease to be equal to or less than the prescribed reference value when the regeneration processing of the particulate filter is performed. Therefore, an internal combustion engine in which, when the amount of ashes on the particulate filter increases, a prescribed reference value for stopping the regeneration processing increases with respect to the pressure difference value before and after the particulate filter is known.

SUMMARY

Since ashes are produced from engine oil mixed in fuel and engine oil is mixed in fuel at a substantially constant ratio, if fuel is consumed, ashes are produced. That is, ashes are produced steadily if the operation of the engine is performed. In a case where incombustible deposits, such as ashes, are generated steadily in this way, as in the known internal combustion engine described above, the amount of increase and the increase time of the reference value can be supposed from an operation history of the engine. However, actually, there is a case where the production of incombustible deposits cannot be supposed, and in a case where incombustible deposits increase abruptly for some reason, that is, in a case where incombustible deposits are produced unsteadily, in the known internal combustion engine described above, the pressure difference value before and after the particulate filter does not decrease to be equal to or lees than the prescribed reference value when the regeneration processing of the particulate filter is performed. As a result, the regeneration processing of the particulate filter is continued over a long time, and thus, there occurs a problem in that energy is consumed wastefully in order to heat the particulate filter.

The disclosure provides an exhaust gas control apparatus for an internal combustion engine capable of suppressing wasteful energy consumption by suppressing extension of a time for which a particulate filter is subjected to regeneration processing.

An aspect of the disclosure provides an exhaust gas control apparatus for an internal combustion engine including a particulate filter configured to trap particulates in exhaust gas, a regeneration processing device configured to perform regeneration processing for eliminating the particulates trapped on the particulate filter, a pressure difference sensor configured to acquire a pressure difference between an upstream and a downstream of the particulate filter, and a control device. The control device is configured to obtain a pressure difference value (first pressure difference value) representing the amount of deposits deposited in the particulate filter based on the pressure difference, set a basic regeneration completion pressure difference value (second pressure difference value) based on a predicted deposition amount of incombustible deposits produced steadily on the particulate filter, set a corrected regeneration completion pressure difference value (third pressure difference value) higher than the basic regeneration completion pressure difference value based on a deposition amount of incombustible deposits deposited unsteadily on the particulate filter, in a case where the pressure difference value decreases to the corrected regeneration completion pressure difference value and then decreases to the basic regeneration completion pressure difference value before a prescribed regeneration completion time (prescribed time) elapses after the regeneration processing by the regeneration processing device starts, end the regeneration processing when the pressure difference value decreases to be equal to or less than the basic regeneration completion pressure difference value, and in a case where a time for which the pressure difference value decreases to the corrected regeneration completion pressure difference value and is then maintained to be equal to or greater than the basic regeneration completion pressure difference value after the regeneration processing by the regeneration processing device starts exceeds a regeneration completion time, end the regeneration processing when the time for which the pressure difference value is maintained to be equal to or greater than the basic regeneration completion pressure difference value exceeds the regeneration completion time. The aspect of the disclosure may be defined as follows. An exhaust gas control apparatus for an internal combustion engine, the exhaust gas control apparatus includes: a particulate filter configured to trap particulates in exhaust gas; a regeneration processing device configured to perform regeneration processing for eliminating the particulates trapped on the particulate filter; a pressure difference sensor configured to acquire a pressure difference between an upstream and a downstream of the particulate filter; and an electronic control unit configured to i) obtain a first pressure difference value representing an amount of deposits deposited in the particulate filter based on the pressure difference, ii) set a second pressure difference value representing an end time of the regeneration processing based on a predicted deposition amount of incombustible deposits produced steadily on the particulate filter, iii) set a third pressure difference value, which is higher than the second pressure difference value and represents an end time of the regeneration processing, based on a deposition amount of incombustible deposits deposited unsteadily on the particulate filter, iv) when the first pressure difference value decreases to the second difference value before a prescribed time elapses after the first pressure difference value decreases to the third pressure difference value during the regeneration processing by the regeneration processing device, end the regeneration processing, and v) when a time for which the first pressure difference value is maintained to be equal to or greater than the second pressure difference value exceeds the prescribed time after the first pressure difference value decreases to the third pressure difference value during the regeneration processing by the regeneration processing device, end the regeneration processing.

According to the exhaust gas control apparatus for an internal combustion engine of the disclosure, since the time for which the particulate filter is subjected to the regeneration processing can be limited to an appropriate time, it is possible to suppress wasteful energy consumption.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4A is a diagram illustrating setting of a new basic regeneration completion pressure difference value PB' when incombustible deposits are not generated unsteadily, and FIG. 4B is a diagram illustrating setting of a new basic regeneration completion pressure difference value PB' when incombustible deposits are generated unsteadily;

DETAILED DESCRIPTION OF EMBODIMENTS

Figure 1:
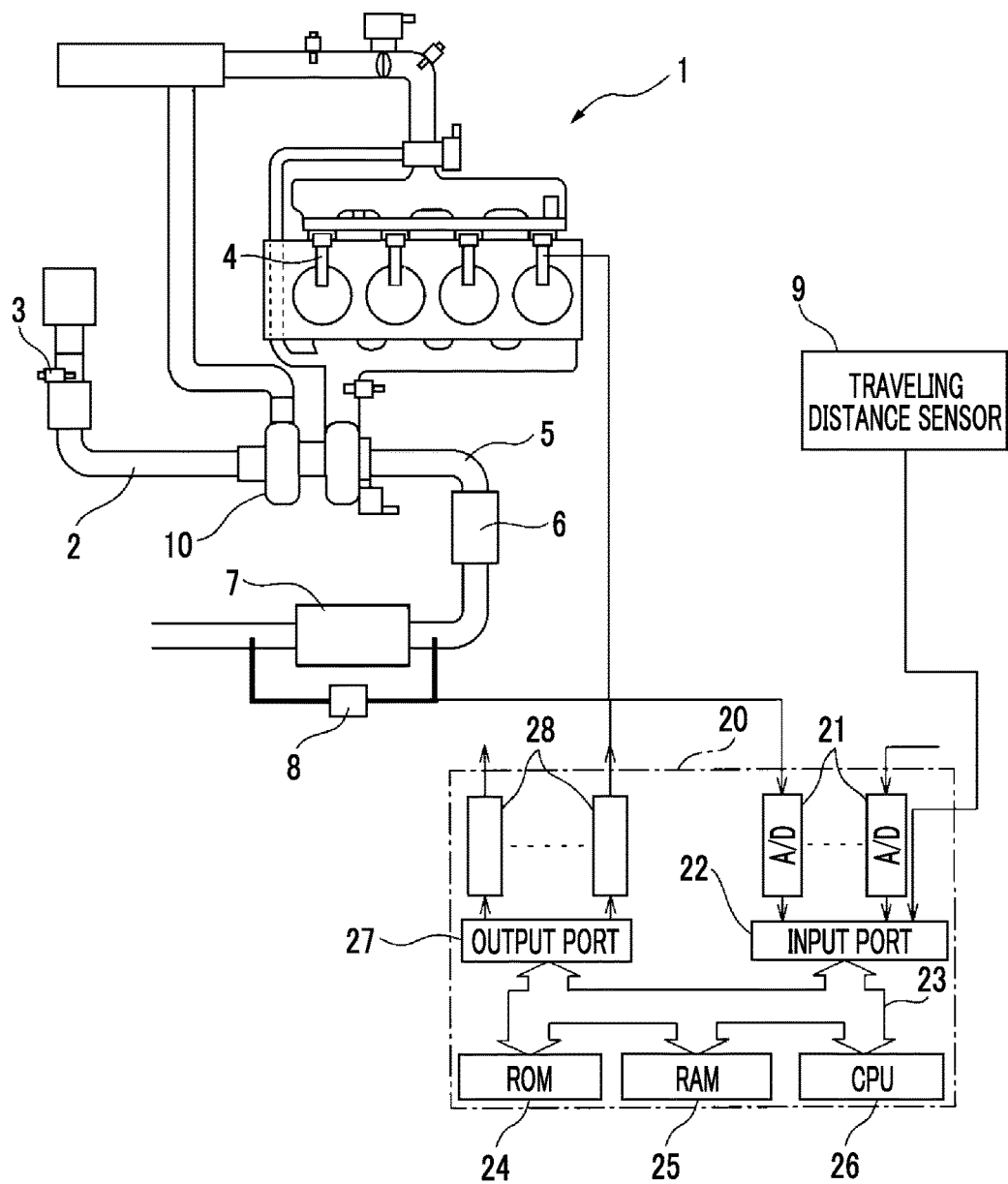
FIG. 1 is a schematic view of an internal combustion engine of the disclosure.

FIG. 1 is a schematic view of an internal combustion engine of the disclosure. Reference numeral 1 represents a diesel engine, reference numeral 2 represents an intake pipe, reference numeral 3 represents an air flowmeter, reference numeral 4 represents an injector for injecting fuel into each combustion chamber, reference numeral 5 represents an exhaust pipe, reference numeral 6 represents an oxidation catalyst, reference numeral 7 represents a particulate filter, reference numeral 8 represents a pressure difference sensor, reference numeral 9 represents a traveling distance sensor, reference numeral 10 represents a turbocharger, and reference numeral 20 represents a control unit. The control unit 20 is constituted of a digital computer, and includes a ROM 24, a RAM 25, a CPU 26, an input port 22, and an output port 27 connected to one another through a bidirectional bus 23. The air flowmeter 3 generates an output voltage proportional to an intake air amount, and the output voltage is input to the input port 22 through a corresponding AD converter 21. The pressure difference sensor 8 generates an output voltage proportional to a pressure difference value between an upstream and a downstream of the particulate filter 7, and the output voltage is input to the input port 22 through the corresponding AD converter 21. The traveling distance sensor 9 generates pulses synchronized with rotation of a propeller shaft, and the pulses are input to the input port 22. In the CPU 26, a traveling distance of the vehicle is calculated based on the pulses. The output port 27 is connected to the injector 4 and the like through a corresponding drive circuit 28.

Next, a factor for causing particulates to be purified and a purification method of particulates will be described. In the diesel engine 1, if fuel injected from the injector 4 is compressed and ignited in the combustion chamber, particulates, such as soot, are generated, and as a result, the particulates are mixed in exhaust gas. In order to prevent the particulates from being discharged into outside air, the particulate filter 7 for trapping the particulates is disposed in the exhaust pipe 5. The particulate filter 7 is formed of porous ceramic in order to trap the particulates. That is, if exhaust gas flows into porous ceramic, the particulates are trapped in pores in the surface of porous ceramic, and accordingly, the particulates in exhaust gas are reduced. On the other hand, if a large amount of particulates is trapped on the particulate filter 7, backpressure increases, causing a decrease in engine output. Accordingly, when a large amount of particulates is trapped on the particulate filter 7, in order to eliminate the particulates trapped on the particulate filter 7, regeneration processing is performed. In an example of the disclosure, the regeneration processing for eliminating the particulates trapped on the particulate filter 7 is performed by heating the particulate filter 7.

In this case, in the example of the disclosure, for example, in order to heat the particulate filter 7, after main fuel injection for generating an engine output is performed, fuel is injected again in a second half of an expansion stroke or a first half of an exhaust stroke. This fuel injection is referred to as post injection. If the post injection is performed, fuel molecules are depolymerized in the combustion chamber, depolymerized fuel is fed to the oxidation catalyst 6 in the exhaust pipe 5. Depolymerized fuel is easily oxidized in the oxidation catalyst 6, and exhaust gas is heated by oxidation reaction heat. At this time, the particulate filter 7 disposed on the downstream of the oxidation catalyst 6 is heated by exhaust gas. With this, the particulates deposited on the particulate filter 7 are combusted, and the regeneration processing of the particulate filter 7 is performed. In order to heat the particulate filter 7, a heater, a burner, or the like may be used.

In a case where an exhaust gas amount, that is, an intake air amount Ga is constant, a pressure difference ΔP detected by the pressure difference sensor 8 is proportional to a deposited particulate amount M on the particulate filter 7 when a pressure difference before and after the particulate filter 7 is small. Accordingly, in this case, it is possible to control the start and stop of regeneration on the particulate filter 7 based on the pressure difference ΔP detected by the pressure difference sensor 8. However, even if the deposited particulate amount of the particulate filter 7 is constant, if the exhaust gas amount, that is, the intake air amount Ga changes, the pressure difference ΔP detected by the pressure difference sensor 8 changes. Accordingly, in this case, it is not possible to control the start and stop of regeneration on the particulate filter 7 based on the pressure difference ΔP detected by the pressure difference sensor 8. Therefore, in order to control the start and stop of regeneration on the particulate filter 7, any value indicating the particulate amount M without being affected by the exhaust gas amount, that is, the intake air amount Ga is required.

Figure 2:
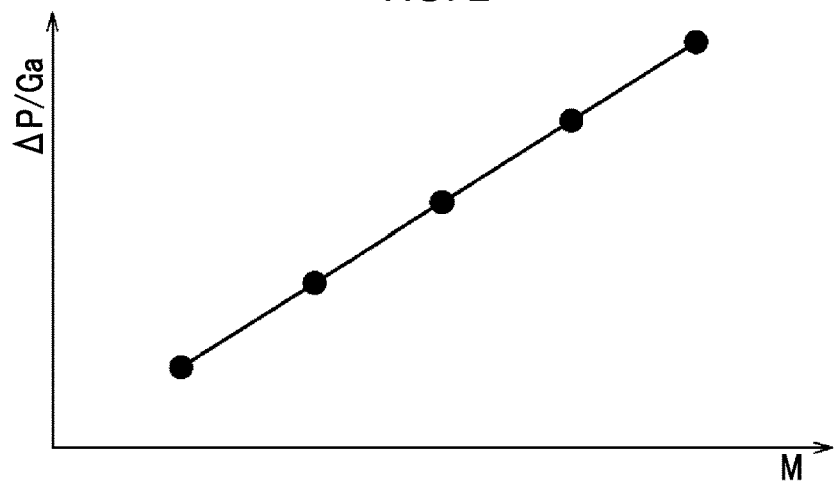
FIG. 2 is a graph showing the correspondence between the amount of particulates trapped on a particulate filter and a pressure difference value ΔP/Ga.

On the other hand, since a gas amount G flowing in the particulate filter 7 is proportional to the pressure difference ΔP when the pressure difference ΔP before and after the particulate filter 7 is small, if a flow rate coefficient of the particulate filter 7 is defined as α, the gas amount G flowing in the particulate filter 7 is represented by $G=\alpha \cdot \Delta P$. Accordingly, the flow rate coefficient α becomes $\alpha=G/\Delta P$. If the deposited particulate amount M on the particulate filter 7 increases, the flow rate coefficient α decreases. That is, the deposited particulate amount M is inversely proportional to the flow rate coefficient α. Accordingly, as shown in FIG. 2, the deposited particulate amount M is proportional to $1/\alpha$, that is, the value of ΔP/G. In other words, the value of ΔP/G indicates the deposited particulate amount M. Accordingly, in the example of the disclosure, the value of ΔP/G is referred to as a pressure difference value, and the start and stop of regeneration on the particulate filter 7 are controlled using the pressure difference value ΔP/G. The deposited particulate amount M indicates the volume or weight of the particulates.

Figure 3A:
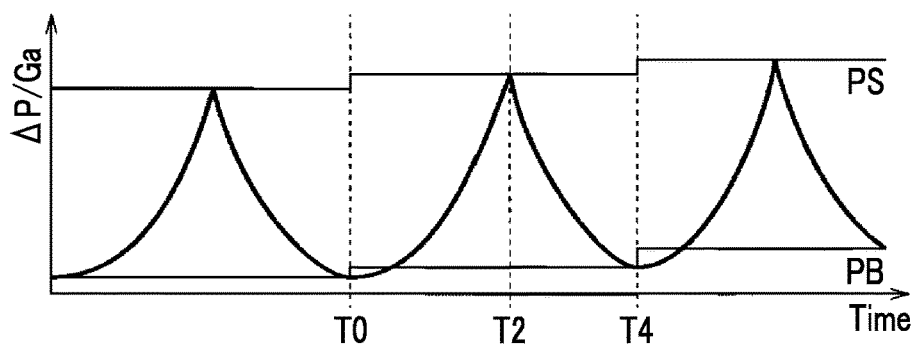
FIG. 3A is a graph showing change with time in pressure difference value when incombustible deposits are not generated unsteadily.

First, in regard to regeneration processing when only incombustible deposits represented by ashes and generated steadily are produced, processing from a state before the regeneration processing and a state in which the regeneration processing ends will be described in time series. Before the regeneration processing, the particulates, such as soot, are gradually accumulated on the particulate filter 7. That is, the accumulated particulate amount increases over time. Next, when the accumulated particulate amount increases and reaches a prescribed amount, the regeneration processing starts for the purpose of eliminating the particulates trapped on the particulate filter 7. On other hand, in the example of the disclosure, the amount of particulates trapped on the particulate filter 7 is presumed based on the pressure difference value ΔP/Ga obtained from the pressure difference sensor 8 and the air flowmeter 3. FIG. 3A shows change with time in the pressure difference value ΔP/Ga.

In FIG. 3A, a time T0 indicates when previous regeneration processing is completed, and a time T2 indicates when present regeneration processing starts. During a period of the time T0 to the time T2, the particulates are gradually accumulated on the particulate filter 7 over time, and the pressure difference value ΔP/Ga increases as the particulates are accumulated on the particulate filter 7. At the time T2, if the pressure difference value ΔP/Ga reaches a prescribed pressure difference value (PS), the regeneration processing starts. Hereinafter, the pressure difference value which becomes a reference for starting the regeneration processing is referred to as a regeneration start pressure difference value PS. The regeneration start pressure difference value PS is set as, for example, a pressure difference value when a prescribed amount of particulates are accumulated on the particulate filter 7. In a case where the regeneration start pressure difference value PS is determined in this way, the amount of particulates eliminated per regeneration processing becomes constant.

Next, processing from the start of the regeneration processing until the end of the regeneration processing will be described. If the regeneration processing starts, the particulates trapped on the particulate filter 7 are combusted and eliminated with the above-described post injection. As the particulates accumulated on the particulate filter 7 are combusted and eliminated, the amount of accumulated particulates decreases. When the amount of particulates decreases to a prescribed amount, since it is considered that the particulates are sufficiently eliminated, the regeneration processing ends, and post injection control ends. Referring to FIG. 3A, after the start of the regeneration processing (time T2), the amount of accumulated particulates gradually decreases with the progress of the regeneration processing, and accordingly, the pressure difference value ΔP/Ga also gradually decreases. Thereafter, if the pressure difference value ΔP/Ga reaches a prescribed pressure difference value PB, that is, if the amount of particulates trapped on the particulate filter 7 reaches a prescribed amount, the regeneration processing ends. The pressure difference value PB for ending the regeneration processing in this way is referred to as a basic regeneration completion pressure difference value PB (second pressure difference value). The basic regeneration completion pressure difference value PB is set as, for example, a pressure difference value when 90% of the particulates trapped on the particulate filter 7 at the time of the start of the regeneration processing are eliminated. The basic regeneration completion pressure difference value PB is set in this way, whereby it is possible to reliably complete the regeneration processing even in a case where a detection error is included in the output of the pressure difference sensor 8.

Next, setting of the basic regeneration completion pressure difference value PB when the regeneration processing ends will be described. As described above, even if the regeneration processing is performed, ashes remain and are deposited on the particulate filter 7. When a large amount of ashes is deposited, for example, even in a case where particulates, such as soot, are not accumulated on the particulate filter 7, the pressure difference value ΔP/Ga may become equal to or greater than the basic regeneration completion pressure difference value PB. In such a case, even if the accumulated particulates are eliminated through the regeneration processing, the pressure difference value ΔP/Ga does not decrease to the basic regeneration completion pressure difference value PB, and the regeneration processing cannot end. Accordingly, the basic regeneration completion pressure difference value PB for use in next regeneration processing is newly set according to the deposition amount of ashes such that the regeneration processing can end. The basic regeneration completion pressure difference value PB newly set at this time increases with respect to the current basic regeneration completion pressure difference value PB. FIG. 4A is a diagram illustrating setting of the next basic regeneration completion pressure difference value PB. As described above, if the time when the pressure difference value ΔP/Ga reaches the prescribed pressure difference value PB, that is, the time when the amount of particulates trapped on the particulate filter 7 decreases to the prescribed amount is defined as a time T4, a new basic regeneration completion pressure difference value PB' is set at the time T4.

In the example of the disclosure, in order to set the new basic regeneration completion pressure difference value PB', an increase amount ΔP1 of the pressure difference value corresponding to a predicted increase amount ΔM1 of ashes is calculated. Next, the increase amount ΔP1 of the pressure difference value is added to the previous basic regeneration completion pressure difference value PB, and the addition result is set as the new basic regeneration completion pressure difference value PB'. The predicted increase amount ΔM1 of the ashes is proportional to the amount of engine oil mixed in fuel, and accordingly, is estimated based on the traveling distance. When the amount of produced ashes is small, the increase amount ΔP1 of the pressure difference value corresponding to the predicted increase amount ΔM1 of the ashes is not necessarily added to the basic regeneration completion pressure difference value PB each time the regeneration processing is completed. For example, the increase amount ΔP1 of the pressure difference value can be added to the basic regeneration completion pressure difference value PB once per ten times of completion of the regeneration processing, or the increase amount ΔP1 of the pressure difference value can be added to the basic regeneration completion pressure difference value PB at every prescribed traveling distance (for example, 500 km).

On the other hand, when the temperature of the particulate filter 7 is low or when the time for which the temperature of the particulate filter 7 is maintained at high temperature is short, the time (this is referred to as a regeneration processing duration) for which the regeneration processing is executed in order to eliminate the trapped particulates is extended. For example, when the regeneration processing is executed with the post injection, if the regeneration processing duration is long, the amount of fuel mixed in engine oil increases, and performance of engine oil is degraded. Accordingly, in the example of the disclosure, when the regeneration processing duration is equal to or longer than a prescribed time (referred to as a regeneration interruption time ΔTx), even if the particulates trapped on the particulate filter 7 are not eliminated, the regeneration processing is interrupted. The regeneration interruption time ΔTx is prescribed, whereby degradation of performance of engine oil is prevented. The regeneration interruption time ΔTx is set to, for example, 45 minutes.

Figure 5:
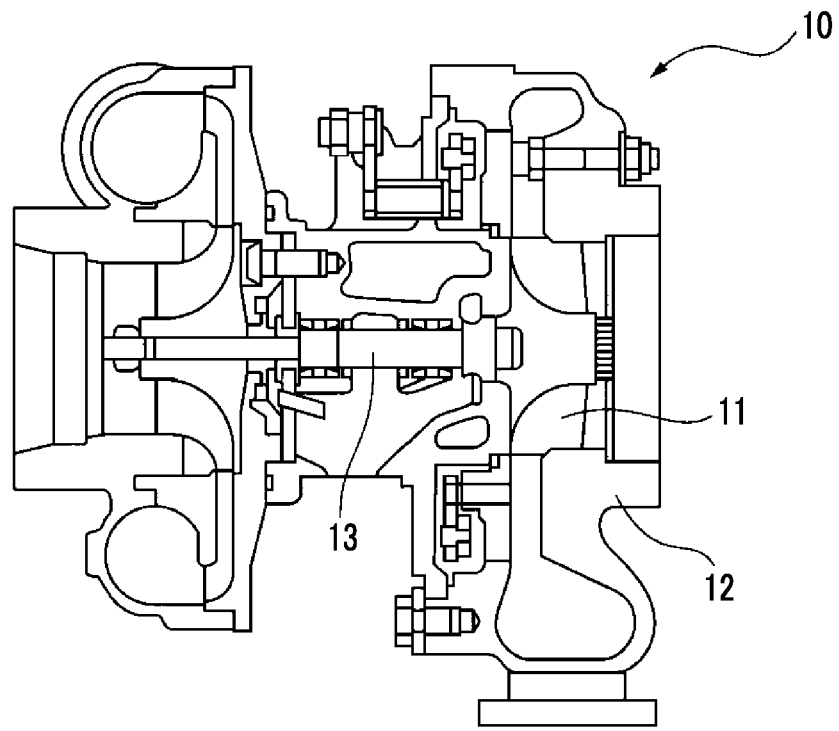
FIG. 5 is a sectional view of a turbocharger.

In addition to the incombustible deposits, such as ashes, which are generated steadily, incombustible deposits which are generated unsteadily may be generated. Hereinafter, regeneration processing in a case where incombustible deposits are generated will be described. As the incombustible deposits which are generated unsteadily, abrasion powder discharged from the turbocharger 10 is exemplified. Accordingly, first, a reason that abrasion powder is generated from the turbocharger 10 will be described. FIG. 5 is a sectional view of the turbocharger 10. The turbocharger 10 has an exhaust side impeller 11, an exhaust side housing 12 which surrounds the exhaust side impeller 11, and a shaft 13 which supports the exhaust side impeller 11. On the inner surface of the exhaust side housing 12, a layer of abradable seal is formed in a region facing the exhaust side impeller 11. The layer of abradable seal is provided in order to improve the efficiency of the turbocharger 10. That is, if the layer of abradable seal is provided, it is possible to narrow the gap between the exhaust side impeller 11 and the exhaust side housing 12. As a result, the exhaust side impeller 11 easily receives force from exhaust gas, and accordingly, the efficiency of the turbocharger 10 is improved.

The distance between the exhaust side impeller 11 and the exhaust side housing 12 may not be maintained constant due to various factors. For example, when the turbocharger 10 has a manufacturing error, when the exhaust side housing 12 is thermally deformed, and when the rotating shaft of the exhaust side impeller 11 is vibrated fractionally since lubricant oil pressure for positioning the shaft 13 is insufficient are exemplified. If the distance between the exhaust side impeller 11 and the exhaust side housing 12 varies in this way, the layer of abradable seal formed in the exhaust side housing 12 and the exhaust side impeller 11 may come into contact with each other. When such contact occurs, the layer of abradable seal is formed of a soft metal, such as Ni, such that the exhaust side impeller 11 is not scraped. As a result, when the exhaust side impeller 11 and the layer of abradable seal come into contact with each other, the layer of abradable seal is scraped, and accordingly, abrasion powder is produced.

If abrasion powder is discharged from the turbocharger 10, abrasion powder is deposited on the particulate filter 7 disposed on the downstream. Since abrasion powder is a metal, abrasion powder is not eliminated even though heated to a temperature (about 600° C.), at which the particulate filter 7 combusts, through the regeneration processing of the particulate filter 7. As described above, there are various causes of abrasion powder generated from the turbocharger 10. For this reason, it is difficult to predict in advance when abrasion powder is discharged. In this way, abrasion powder discharged from the turbocharger 10 is a kind of incombustible deposits generated unsteadily.

Next, in regard to regeneration processing when incombustible deposits generated unsteadily as represented by abrasion powder are produced, processing from a state before the regeneration processing to a state in which the regeneration processing ends will be described in time series. Hereinafter, description will be provided assuming that abrasion powder is discharged from the turbocharger 10 when the regeneration processing is not performed before the regeneration processing. In the meantime, since abrasion powder is discharged from the turbocharger 10 before the regeneration processing, before the regeneration processing, abrasion powder is deposited simultaneously with accumulation of particulates, such as soot, on the particulate filter 7. Next, when the total of the amount of particulates, such as soot, and the amount of abrasion powder reaches a prescribed amount, the regeneration processing is started for the purpose of eliminating the particulates trapped on the particulate filter 7.

Figure 3B:
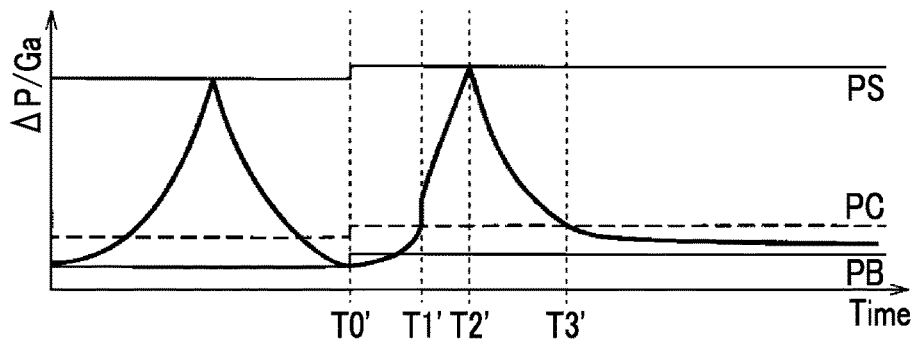
FIG. 3B is a graph showing change with time in pressure difference value when incombustible deposits are generated unsteadily.

The change with time in the pressure difference value ΔP/Ga at this time, that is, changes with time in the amount of particulates, such as soot, trapped on the particulate filter 7 and the amount of abrasion powder are shown in FIG. 3B. In FIG. 3B, a time T0' indicates when previous regeneration processing is completed, and a time T2' indicates when present regeneration processing starts. During a period of the time T0' to the time T2', the particulates, such as soot, are gradually accumulated on the particulate filter 7 over time, and as the particulates, such as soot, are accumulated on the particulate filter 7, the pressure difference value ΔP/Ga increases. A time T1' indicates when abrasion powder is generated. FIG. 3B shows a case where a large amount of abrasion powder is generated for a short time at the time T1'. Accordingly, at the time T1', since a large amount of abrasion powder discharged from the turbocharger 10 is deposited on the particulate filter 7 for a short time, the pressure difference value ΔP/Ga increases rapidly at the time T1'.

Subsequently, processing from when the regeneration processing starts until the regeneration processing ends will be described. A specific method of the regeneration processing is as described above, description thereof will not be repeated, and only processing when the regeneration processing ends will be described. When the amount of incombustible deposits, such as abrasion powder, generated unsteadily is large, as shown in FIG. 3B, the pressure difference value ΔP/Ga does not decrease to the basic regeneration completion pressure difference value PB, and stagnates at a value slightly higher than the basic regeneration completion pressure difference value PB in the vicinity of the basic regeneration completion pressure difference value PB. At this time, the pressure difference value ΔP/Ga does not decrease to the basic regeneration completion pressure difference value PB even after lapse of a long time, and accordingly, the regeneration processing is continued.

Accordingly, in the example of the disclosure, as described above, a new reference for the deposited particulate amount, that is, a new reference for the pressure difference value ΔP/Ga is set so as to capture a case where the pressure difference value ΔP/Ga stagnates in the vicinity of the basic regeneration completion pressure difference value PB as described above. In the example of the disclosure, the new reference for the pressure difference value ΔP/Ga is referred to as a corrected regeneration completion pressure difference value PC, and the corrected regeneration completion pressure difference value PC is indicated by a broken line in FIG. 3B. As shown in FIG. 3B, the corrected regeneration completion pressure difference value PC is a value slightly greater than the basic regeneration completion pressure difference value PB. As shown in FIG. 3B, in a case where the pressure difference value ΔP/Ga stagnates in the vicinity of the basic regeneration completion pressure difference value PB, in the example of the disclosure, the regeneration processing ends when a prescribed time has elapsed after a decrease in the pressure difference value ΔP/Ga to the corrected regeneration completion pressure difference value PC. In the example of the disclosure, the prescribed time is referred to as a regeneration completion time ΔT.

The corrected regeneration completion pressure difference value PC (third pressure difference value) is a pressure difference value for confirming that combustion of the particulates trapped on the particulate filter 7 is in progress, that is, an elimination operation of the particulates is in progress. In this case, in the example of the disclosure, the sum of a pressure difference value (fourth pressure difference value) which increases when the layer of abradable seal of the turbocharger 10 entirely becomes abrasion powder and is deposited on the particulate filter 7 and the basic regeneration completion pressure difference value PB is set as the corrected regeneration completion pressure difference value PC. That is, the corrected regeneration completion pressure difference value PC is set to be equal to or greater than the sum of the pressure difference value which increases when abrasion powder discharged from the turbocharger 10 is deposited on the particulate filter 7 and the basic regeneration completion pressure difference value PB. With such setting, for example, even if abrasion powder is generated, since the pressure difference value decreases to the corrected regeneration completion pressure difference value PC if the regeneration processing progresses, it is possible to more reliably confirm that the regeneration processing is in progress. The corrected regeneration completion pressure difference value PC is set as, for example, a pressure difference value when 80% of the particulates trapped on the particulate filter 7 at the time of the start of the regeneration processing are eliminated.

As shown in FIG. 3B, the above-described regeneration completion time ΔT is a time for which it can be estimated that the particulates trapped on the particulate filter 7 are substantially eliminated even if the operation state of the engine changes in various ways when the pressure difference value ΔP/Ga is continuously maintained between the basic regeneration completion pressure difference value PB and the corrected regeneration completion pressure difference value PC. That is, the regeneration completion time ΔT is a time for which it can be estimated that only incombustible deposits substantially remain on the particulate filter 7. The regeneration completion time ΔT is obtained by an experiment. As a specific example, the regeneration completion time ΔT is set as a time shorter than the regeneration interruption time ΔTx. For example, the regeneration completion time ΔT is set to 10 minutes. When the regeneration processing is performed, in a case where the pressure difference value ΔP/Ga decreases to the basic regeneration completion pressure difference value PB, a time until the pressure difference value ΔP/Ga becomes the corrected regeneration completion pressure difference value PC and then decreases to the basic regeneration completion pressure difference value PB is shorter than the regeneration completion time ΔT. Accordingly, even if the regeneration completion time ΔT elapses after the pressure difference value ΔP/Ga becomes the corrected regeneration completion pressure difference value PC, when the pressure difference value ΔP/Ga does not decrease to the basic regeneration completion pressure difference value PB, it can be estimated that incombustible deposit generated unsteadily, that is, abrasion powder is deposited, and at this time, the regeneration processing ends.

Figure 6:
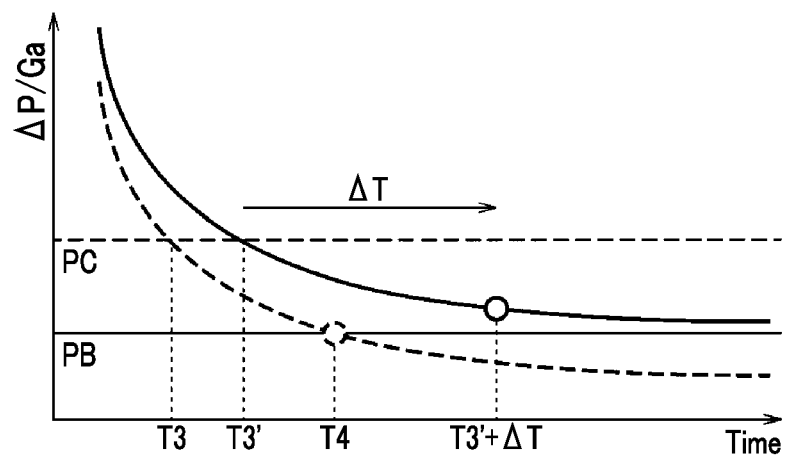
FIG. 6 is a graph of the periphery of a time T3 of FIGS. 3A and 3B on an enlarged scale.

Next, end processing of the regeneration processing using the corrected regeneration completion pressure difference value PC will be specifically described referring to FIG. 6. FIG. 6 is a time chart showing change with time in pressure difference value with the vicinity of the basic regeneration completion pressure difference value PB shown on an enlarged scale. A solid line of FIG. 6 is an enlarged view of a part of the solid line shown in FIG. 3B, and represents change with time in pressure difference value when incombustible deposits, such as abrasion powder, are generated unsteadily. As indicated by the solid line in FIG. 6, after the regeneration processing starts, if the pressure difference value ΔP/Ga decreases to the corrected regeneration completion pressure difference value PC at a time T3', the measurement of the elapsed time starts, and if the elapsed time becomes the regeneration completion time ΔT, the regeneration processing ends. That is, when the condition that the pressure difference value ΔP/Ga decreases to the corrected regeneration completion pressure difference value PC is satisfied, it is estimated that combustion of the particulates trapped on the particulate filter 7 is in progress, that is, it is estimated that the elimination operation of the particulates is in progress. When the condition that the time for which the pressure difference value ΔP/Ga decreases to the corrected regeneration completion pressure difference value PC and is then maintained to be equal to or greater than the basic regeneration completion pressure difference value PB is continued for the regeneration completion time ΔT is satisfied, it is estimated that a decrease in the pressure difference value ΔP/Ga is suppressed with an increase in the pressure difference value ΔP/Ga due to incombustible deposits. Accordingly, when the two conditions are satisfied, it is estimated that, while elimination of the particulates trapped on the particulate filter 7 ends, the pressure difference value ΔP/Ga does not decrease due to incombustible deposits. In the example of the disclosure, at this time, since the regeneration processing ends, it is possible to suppress extension of a regeneration processing time, and accordingly, to suppress energy consumption.

Next, a difference between when abrasion powder is generated and when abrasion powder is not generated will be described. A dotted line of FIG. 6 is an enlarged view of a part of the solid line shown in FIG. 3A, and represents change with time in pressure difference value when abrasion powder is not generated. The change with time in the pressure difference value ΔP/Ga when abrasion powder is generated undergoes change like the increase amount of the pressure difference value ΔP/Ga due to abrasion powder with respect to change with time in the pressure difference value ΔP/Ga when abrasion powder is not generated. As a result, when abrasion powder is not generated, the pressure difference value ΔP/Ga decreases to the basic regeneration completion pressure difference value PB; however, when abrasion powder is generated, the pressure difference value ΔP/Ga decreases to the basic regeneration completion pressure difference value PB. The regeneration completion time ΔT is longer than a time for which the pressure difference value ΔP/Ga decreases to the corrected regeneration completion pressure difference value PC and then becomes the basic regeneration completion pressure difference value PB when the abrasion powder is not generated. However, when abrasion powder is generated, since the regeneration processing ends when the time has elapsed by the regeneration completion time ΔT, the regeneration processing time is reduced compared to a case where the regeneration completion time ΔT is not provided.

Next, setting of a new basic regeneration completion pressure difference value PB' which is performed when the time for which the pressure difference value ΔP/Ga decreases to the corrected regeneration completion pressure difference value PC and is then maintained to be equal to or greater than the basic regeneration completion pressure difference value PB becomes the regeneration completion time ΔT, that is, at a time T3'+ΔT will be described. FIG. 4B is a diagram illustrating setting of the next basic regeneration completion pressure difference value PB'. As described above, the regeneration processing ends at the time T3'+ΔT, and at this time, as shown in FIG. 4B, the new basic regeneration completion pressure difference value PB' is set. In this case, when the next regeneration processing is performed, in order to prevent the pressure difference value ΔP/Ga from not decreasing to the basic regeneration completion pressure difference value PB, the basic regeneration completion pressure difference value PB increases taking the amount of incombustible deposits deposited on the particulate filter 7 into consideration. In this case, that is, in a case where the regeneration processing ends based on the regeneration completion time ΔT, as the incombustible deposits, incombustible deposits, such as ashes, generated steadily and incombustible deposits, such as abrasion powder, generated unsteadily are taken into consideration.

The incombustible deposits, such as ashes, generated steadily have already been described, and description thereof will not be repeated. In the meantime, an increase amount ΔM2 of the incombustible deposits, such as abrasion powder, generated unsteadily is obtained, for example, as follows. That is, as described above, when the regeneration processing ends, since a state in which only incombustible deposits are substantially deposited on the particulate filter 7 is estimated, the differential pressure difference value ΔP2 between the pressure difference value ΔP/Ga and the basic regeneration completion pressure difference value PB when the regeneration processing ends becomes a pressure difference value corresponding to the increase amount ΔM2 of the incombustible deposits generated unsteadily. With this, a predicted increase amount ΔM2 of the incombustible deposits generated unsteadily is obtained. Next, the increase amount ΔM2 of the incombustible deposits, such as abrasion powder, generated unsteadily is added to the increase amount ΔM1 of the incombustible deposits, such as ashes, generated steadily, and the total ΔM (=ΔM1+ΔM2) of the increase amounts of the incombustible deposits is calculated. Finally, the new basic regeneration completion pressure difference value PB' is set based on an increase pressure difference value ΔP corresponding to the total ΔM of the increase amounts of the incombustible deposit.

In regard to the corrected regeneration completion pressure difference value PC, similarly, an increase pressure difference value ΔP is calculated based on an increase amount ΔMA of the incombustible deposits generated steadily and an increase amount ΔMB of the incombustible deposits generated unsteadily, and a new corrected regeneration completion pressure difference value PC' is set by adding the increase pressure difference value ΔP to the present corrected regeneration completion pressure difference value PC. The regeneration start pressure difference value PS is also set similarly.

As will be understood from the above description, in the disclosure, the basic regeneration completion pressure difference value PB is obtained based on the predicted deposition amount of the incombustible deposits produced steadily on the particulate filter 7, and the corrected regeneration completion pressure difference value PC is obtained based on the predicted deposition amount of the incombustible deposits produced steadily on the particulate filter 7. In the disclosure, in a case where the pressure difference value ΔP/Ga decreases to the corrected regeneration completion pressure difference value PC and then decreases to the basic regeneration completion pressure difference value PB before the prescribed regeneration completion time ΔT elapses after the regeneration processing starts, the regeneration processing ends when the pressure difference value ΔP/Ga decreases to the basic regeneration completion pressure difference value PB. In a case where the time for which the pressure difference value ΔP/Ga decreases to the corrected regeneration completion pressure difference value PC and is then maintained to be equal to or greater than the basic regeneration completion pressure difference value PB after the regeneration processing starts exceeds the regeneration completion time ΔT the regeneration processing ends when the time for which the pressure difference value is maintained to be equal to or greater than the basic regeneration completion pressure difference value PB exceeds the regeneration completion time ΔT.

That is, in the disclosure, the exhaust gas control apparatus of the internal combustion engine includes the particulate filter 7 configured to trap the particulates in exhaust gas, a regeneration processing device configured to perform the regeneration processing for eliminating the particulates trapped on the particulate filter 7, the pressure difference sensor 8 configured to acquire the pressure difference between the upstream and the downstream of the particulate filter 7, and the control unit (Electronic Control Unit) 20, the control unit 20 is configured to obtain the pressure difference value ΔP/Ga (first pressure difference value) representing the amount of deposits deposited on the particulate filter 7 based on the above-described pressure difference, set the basic regeneration completion pressure difference value PB based on the predicted deposition amount of the incombustible deposits produced steadily on the particulate filter 7, set the corrected regeneration completion pressure difference value PC higher than the basic regeneration completion pressure difference value PB based on the deposition amount of the incombustible deposits deposited unsteadily on the particulate filter 7, in a case where the pressure difference value ΔP/Ga decreases to the corrected regeneration completion pressure difference value PC and then decreases to the basic regeneration completion pressure difference value PB before the prescribed regeneration completion time ΔT elapses after the regeneration processing by the regeneration processing device starts, end the regeneration processing when the pressure difference value ΔP/Ga decreases to be equal to or less than the basic regeneration completion pressure difference value PB, and in a case where the time for which the pressure difference value ΔP/Ga decreases to the corrected regeneration completion pressure difference value PC and is then maintained to be equal to or greater than the basic regeneration completion pressure difference value PB after the regeneration processing by the regeneration processing device starts exceeds the regeneration completion time ΔT, ends the regeneration processing when the time for which the pressure difference value is maintained to be equal to or greater than the basic regeneration completion pressure difference value PB exceeds the regeneration completion time ΔT.

In the example of the disclosure, when the regeneration processing ends with the time for which the pressure difference value decreases to the corrected regeneration completion pressure difference value and is then maintained to be equal to or greater than the basic regeneration completion pressure difference value PB after the regeneration processing starts exceeds the regeneration completion time ΔT, the basic regeneration completion pressure difference value PB and the corrected regeneration completion pressure difference value PC in the next regeneration processing are set based on the differential pressure difference value between the basic regeneration completion pressure difference value PB and the pressure difference value ΔP/Ga when the regeneration processing ends.

Figure 7:
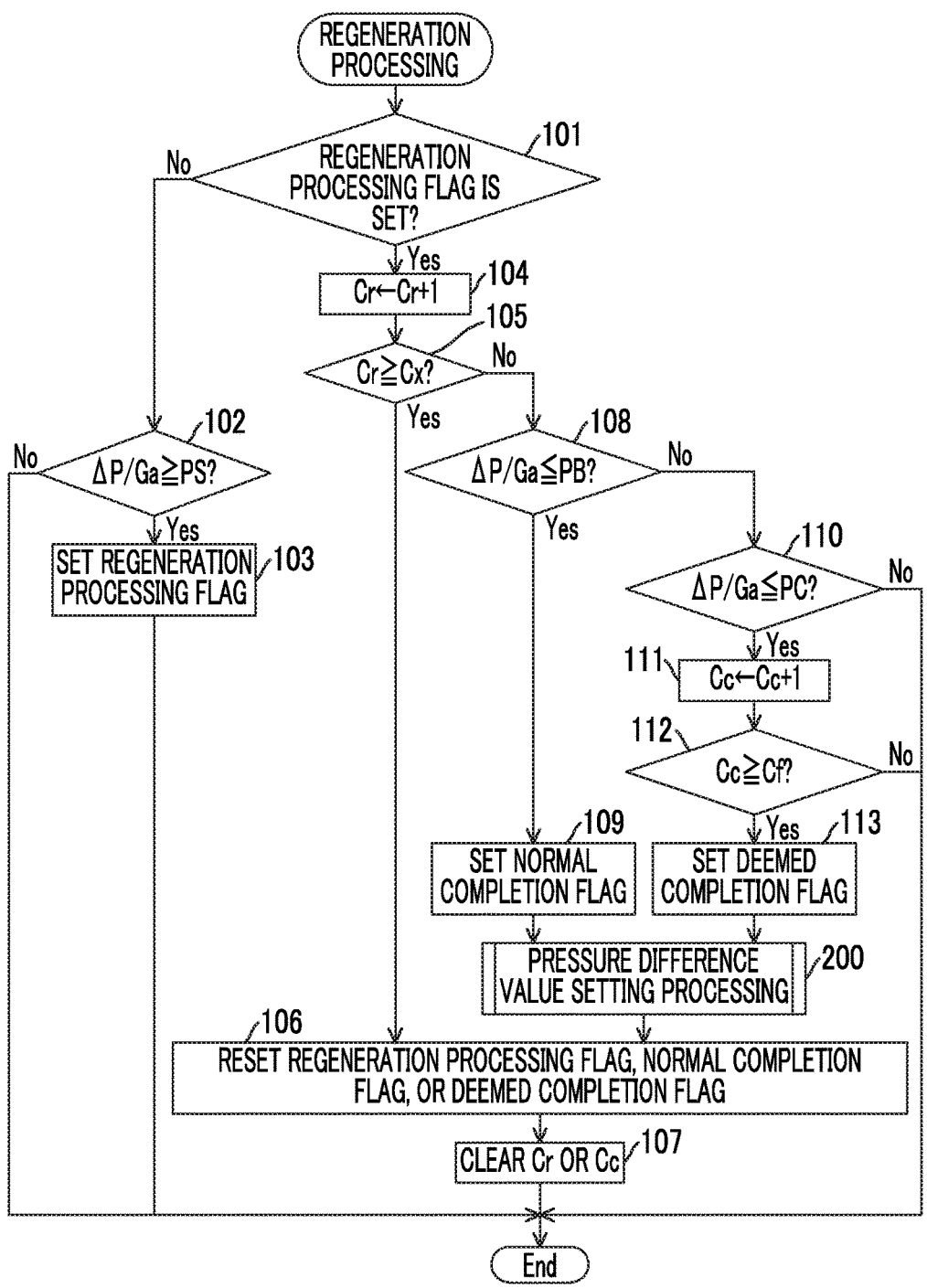
FIG. 7 is a flowchart showing a first example for performing regeneration processing of a particulate filter.

FIG. 7 shows a first example of a routine for performing the regeneration processing of the particulate filter. The routine is executed by interrupt at every given time. Referring to FIG. 7, first, in Step 101, it is determined whether or not a regeneration processing flag is set. The regeneration processing flag is set while the regeneration processing is being executed. That is, in Step 101, it is determined whether or not the regeneration processing of the particulate filter 7 is being performed. When the regeneration processing flag is not set, the process progresses to Step 102. In Step 102, it is determined whether or not the pressure difference value ΔP/Ga before and after the particulate filter 7 calculated from the pressure difference ΔP detected by the pressure difference sensor 8 and the intake air amount Ga detected by the air flowmeter 3 is equal to or greater than the regeneration start pressure difference value PS. When the pressure difference value ΔP/Ga is equal to or greater than the regeneration start pressure difference value PS, the process progresses to Step 103, and when the pressure difference value ΔP/Ga is less than the regeneration start pressure difference value PS, a processing cycle ends. In Step 103, the regeneration processing flag is set. When the regeneration processing flag is set, the regeneration processing is executed with a routine of executing the regeneration processing (for example, a routine of executing the post injection control).

In contrast, in Step 101, when it is determined that the regeneration processing flag is set, the process progresses to Step 104. In Step 104, a count value Cr of a regeneration counter is incremented by 1, and the process progresses to Step 105. Accordingly, the count value Cr of the regeneration counter indicates the elapsed time after the regeneration processing starts. Next, in Step 105, it is determined whether or not the count value Cr of the regeneration counter becomes equal to or greater than a regeneration interruption count value Cx. The regeneration interruption count value Cx represents the regeneration interruption time ΔTx. When the count value Cr of the regeneration counter becomes equal to or greater than the regeneration interruption count value Cx, the process progresses to Step 106, and when the count value Cr of the regeneration counter is less than the regeneration interruption count value Cx, the process progresses to Step 108. In Step 106, the regeneration processing flag is reset. If the regeneration processing flag is reset, the regeneration processing ends with the routine of executing the regeneration processing. Thereafter, the process progresses to Step 107. In Step 107, the count value Cr of the regeneration counter and a count value Cc are cleared, and the processing cycle ends.

In contrast, in Step 105, when it is determined that the count value Cr of the regeneration counter is less than the regeneration interruption count value Cx, the process progresses to Step 108. In Step 108, it is determined whether or not the pressure difference value ΔP/Ga becomes equal to or less than the basic regeneration completion pressure difference value PB. When the pressure difference value ΔP/Ga becomes equal to or less than the basic regeneration completion pressure difference value PB, the process progresses to Step 109, and when the pressure difference value ΔP/Ga is greater than the basic regeneration completion pressure difference value PB, the process progresses to Step 110. In Step 109, a normal completion flag is set. The normal completion flag is a flag which is set when the regeneration processing ends with the pressure difference value ΔP/Ga becoming equal to or less than the basic regeneration completion pressure difference value PB. When this flag is set, the particulates trapped on the particulate filter 7 are eliminated, and the incombustible deposits generated unsteadily on the particulate filter 7 are not almost deposited. The processing of Step 109 ends, the process progresses to Step 200.

In Step 200, the new regeneration start pressure difference value PS', basic regeneration completion pressure difference value PB', and corrected regeneration completion pressure difference value PC' for use when the next regeneration processing is performed are set. This processing is referred to as pressure difference value setting processing, and the details of the pressure difference value setting processing will be described below. If the processing of Step 200 ends, the process progresses to Step 106, and the normal completion flag is reset. Next, the process progresses to Step 107, and next, the processing cycle ends.

In Step 108, when it is determined that the pressure difference value ΔP/Ga is greater than the basic regeneration completion pressure difference value PB, the process progresses to Step 110. In Step 110, it is determined whether or not the pressure difference value ΔP/Ga becomes equal to or less than the corrected regeneration completion pressure difference value PC. When the pressure difference value ΔP/Ga becomes equal to or less than the corrected regeneration completion pressure difference value PC, the process progresses to Step 111, and when the pressure difference value ΔP/Ga is greater than the corrected regeneration completion pressure difference value PC, the processing cycle ends. In Step 111, a count value Cc of a correction counter is incremented by 1, and the process progresses to Step 112. The count value Cc of the correction counter represents a time for which the pressure difference value ΔP/Ga is maintained to be equal to or less than the corrected regeneration completion pressure difference value PC. In Step 112, it is determined whether or not the count value Cc of the correction counter becomes equal to or greater than a regeneration completion count value Cf. When the count value Cc of the correction counter becomes equal to or greater than the regeneration completion count value Cf, the process progresses to Step 113, and when the count value Cc of the correction counter is less than the regeneration completion count value Cf, the processing cycle ends. The regeneration completion count value Cf represents the regeneration completion time ΔT. In Step 113, a deemed completion flag is set. When the deemed completion flag is set, this means when the particulates trapped on the particulate filter 7 are eliminated, and the incombustible deposits generated unsteadily on the particulate filter 7 are deposited. If the processing of Step 113 ends, the process progresses to Step 200. If the processing of Step 200 ends, the process progresses to Step 106, and the deemed completion flag is reset. Next, the process progresses to Step 107, and next, the processing cycle ends.

Figure 8:
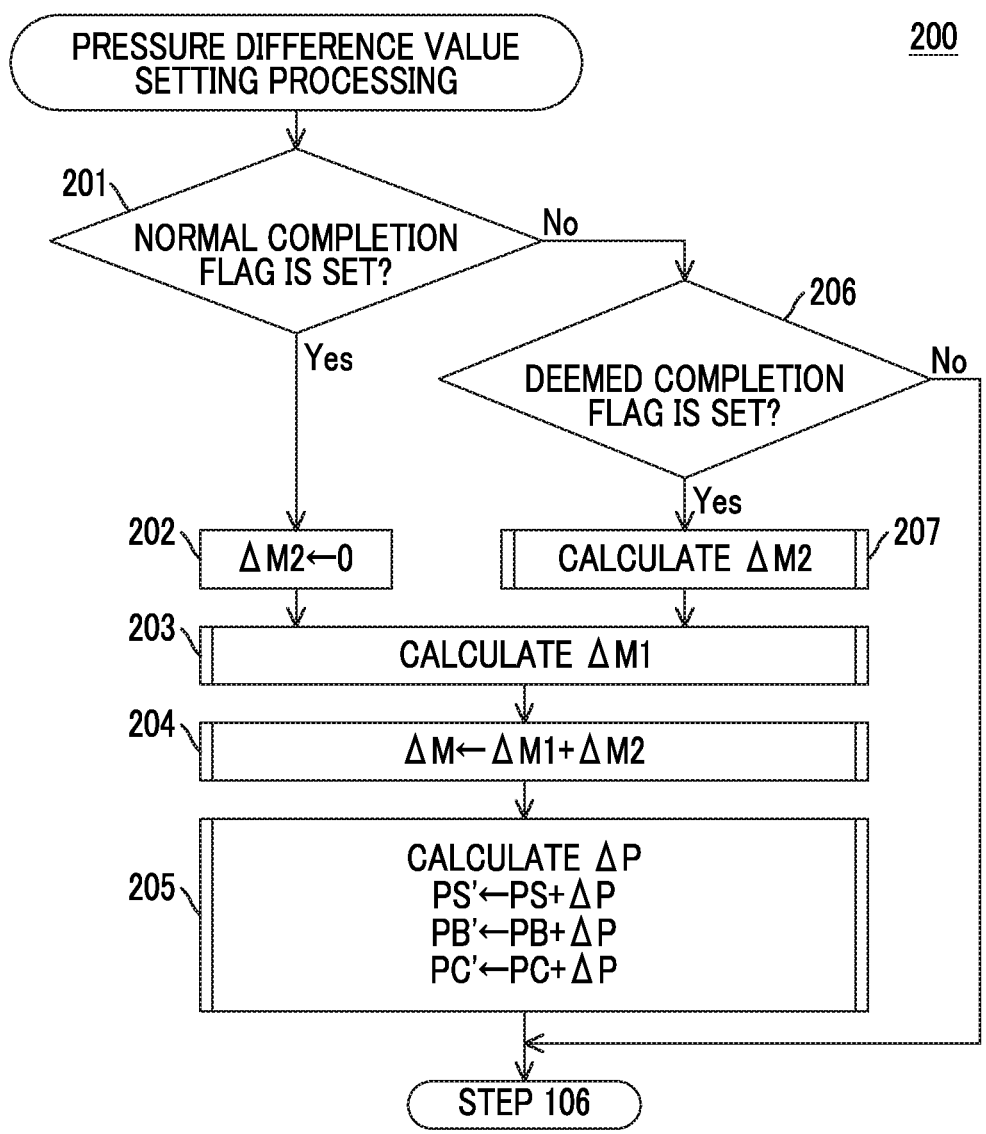
FIG. 8 is a flowchart for performing pressure difference value setting processing.

FIG. 8 shows a routine of the pressure difference value setting processing which is executed in Step 200 of FIG. 7. Referring to FIG. 8, in Step 201, it is determined whether or not the normal completion flag is set. In Step 201, when the normal completion flag is set, the process progresses to Step 202, and when the normal completion flag is not set, the process progresses to Step 206. In Step 202, the increase amount ΔM2 of the incombustible deposits generated unsteadily becomes 0. When the normal completion flag is set, since it is estimated that the incombustible deposits generated unsteadily are not almost deposited, the increase amount ΔM2 becomes 0. If the processing of Step 202 ends, the process progresses to Step 203.

In contrast, in Step 201, when it is determined that the normal completion flag is not set, the process progresses to Step 206, and it is determined whether or not the deemed completion flag is set. When the deemed completion flag is set, the process progresses to Step 207, and when the deemed completion flag is not set, the process progresses to Step 106 of FIG. 7. In Step 207, the increase amount ΔM2 of the incombustible deposits generated unsteadily is calculated based on the pressure difference value ΔP2 obtained by subtracting the basic regeneration completion pressure difference value PB from the pressure difference value ΔP/Ga at the time of regeneration completion, that is, the current pressure difference value ΔP/Ga. If the processing of Step 207 ends, the process progresses to Step 203.

In Step 203, the increase amount ΔM1 of the incombustible deposits generated steadily is calculated. The increase amount ΔM1 of the incombustible deposits generated steadily is obtained in advance. If the processing of Step 203 ends, the process progresses to Step 204. In Step 204, the sum of the increase amount ΔM1 of the incombustible deposits generated steadily and the increase amount ΔM2 of the deposits generated unsteadily becomes the increase amount ΔM of the incombustible deposits. If the processing of Step 204 ends, the process progresses to Step 205. In Step 205, the increase amount ΔP of the pressure difference value corresponding to ΔM obtained in Step 204 is calculated, and the differential pressure difference value ΔP is added to the current regeneration start pressure difference value PS, basic regeneration completion pressure difference value PB, and corrected regeneration completion pressure difference value PC, respectively. With this, the new regeneration start pressure difference value PS', basic regeneration completion pressure difference value PB', and corrected regeneration completion pressure difference value PC' when the next regeneration processing is performed are set. If the processing of Step 205 ends, the process progresses to Step 106 of FIG. 7.

Next, a second example of the disclosure will be described. In the second example, unlike the first example, only when it is estimated that unsteady incombustible deposits are generated, regeneration end processing based on the corrected regeneration completion pressure difference value PC is executed. For example, for some time after the vehicle starts to be used, while the layer of abradable seal of the turbocharger 10 is scraped and abrasion powder is discharged from the turbocharger 10, such a scraping operation of the layer of abradable seal is gradually weakened, and if the vehicle is used over a long period, discharging of abrasion powder from the turbocharger 10 is stopped. If discharging of abrasion powder is stopped, the use of the corrected regeneration completion pressure difference value PC becomes meaningless. In this case, there is a total traveling distance of the vehicle at which abrasion powder is not almost generated, and in the example of the disclosure, the traveling distance of the vehicle at which abrasion powder is not almost generated is referred to as an abrasion powder generation end distance Dx (predetermined distance).

Accordingly, in the second example, only when the total traveling distance D of the vehicle is equal to or less than the abrasion powder generation end distance Dx, the regeneration end processing based on the corrected regeneration completion pressure difference value PC is executed, when the total traveling distance D of the vehicle exceeds the abrasion powder generation end distance Dx, the regeneration end processing based on the corrected regeneration completion pressure difference value PC is stopped. If the regeneration end processing based on the corrected regeneration completion pressure difference value PC is stopped, since the regeneration processing is continued even after the regeneration completion time ΔT has elapsed, the regeneration processing time per once is extended. However, since the number of times in which the regeneration processing is performed decreases, it is possible to reduce the number of times of heating the particulate filter 7 to a regeneration temperature, and as a result, energy consumption is reduced. The abrasion powder generation end distance Dx is set to, for example, 1000 km. The abrasion powder generation end distance Dx is different depending on the type of engine or the type of turbocharger, and is thus determined empirically and experimentally.

Figure 9:
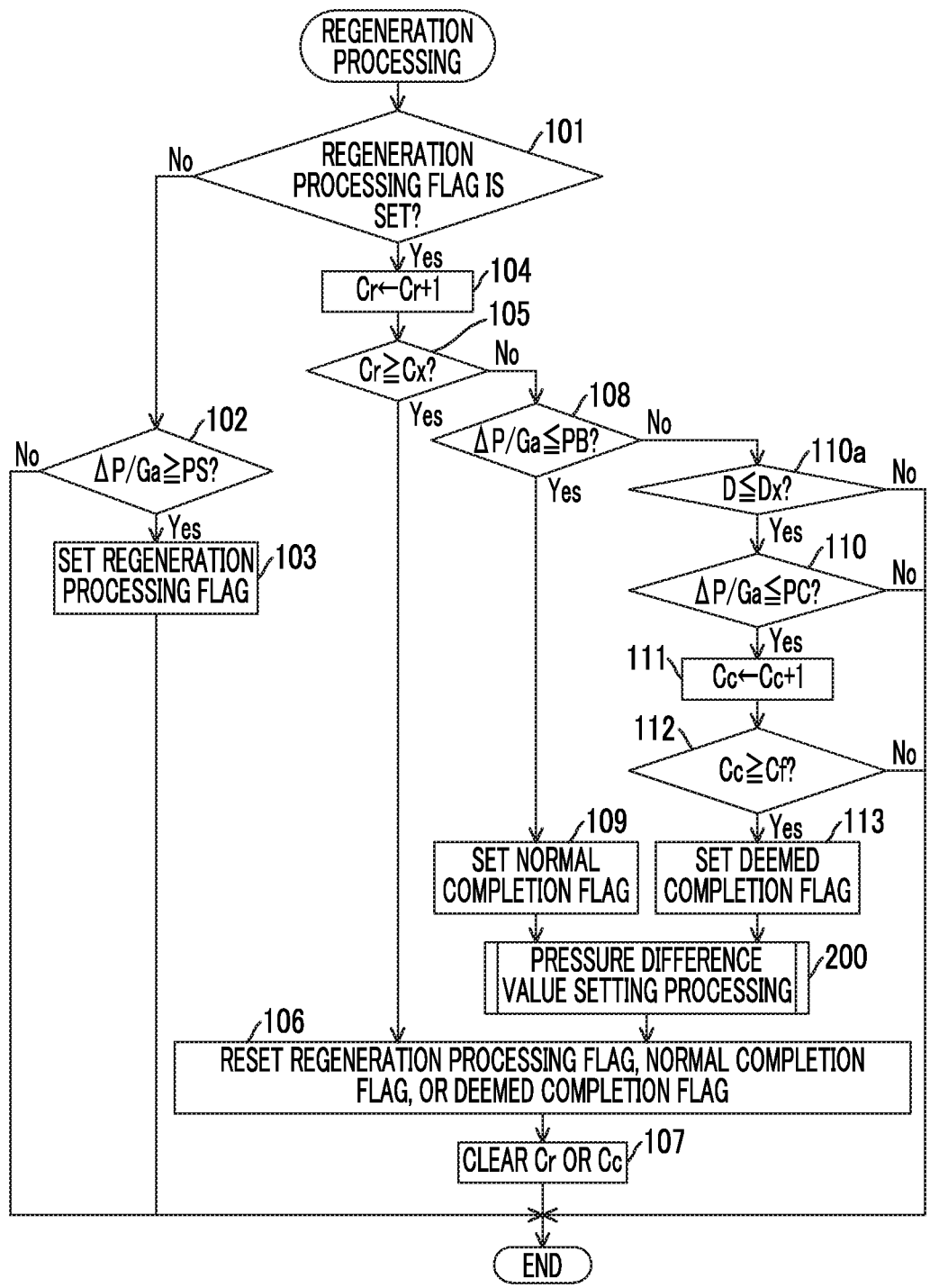
FIG. 9 is a flowchart showing a second example for performing regeneration processing of a particulate filter.

FIG. 9 shows a regeneration processing routine of the particulate filter for executing the second example. This routine is executed by interrupt at every given time. The difference between the processing routine shown in FIG. 7 and the processing routine shown in FIG. 9 is only that, in the processing routine shown in FIG. 9, Step 110a is added before Step 110, and all of remaining Steps 101 to 113 and Step 200 in the processing routine shown in FIG. 7 are the same as those in the processing routine shown in FIG. 9. Accordingly, hereinafter, description of Steps 101 to 113 and Step 200 will not be repeated, and only Step 110a will be described.

Referring to FIG. 9, in Step 110a, it is determined whether or not the total traveling distance D is equal to or less than the abrasion powder generation end distance Dx. When the total traveling distance D is equal to or less than the abrasion powder generation end distance Dx, the process progresses to Step 110, and when the total traveling distance D is greater than the abrasion powder generation end distance Dx, the processing cycle ends. Accordingly, in the second example, if the total traveling distance D becomes equal to or greater than the abrasion powder generation end distance Dx, the regeneration processing does not end based on the corrected regeneration completion pressure difference value PC. That is, while a state in which the pressure difference value ΔP/Ga becomes equal to or less than the corrected regeneration completion pressure difference value PC is maintained, even if the regeneration completion time ΔT has elapsed, the regeneration processing does not end and is continued.

In this way, in the second example, the traveling distance of the vehicle at which abrasion powder is not discharged from the turbocharger 10 is recorded as the abrasion powder generation end distance Dx, and when the regeneration processing is performed and the time for which the pressure difference value ΔP/Ga decreases to be equal to or less than the corrected regeneration completion pressure difference value PC and is then maintained to be equal to or greater than the basic regeneration completion pressure difference value PM exceeds the regeneration completion time ΔT, the regeneration processing ends only when the total traveling distance D of the vehicle is equal to or less than the abrasion powder generation end distance Dx.

As a modification example, a cumulative number of times in which a time for which the pressure difference value ΔP/Ga is greater than the basic regeneration completion pressure difference value PB and is equal to or less than the corrected regeneration completion pressure difference value PC exceeds the regeneration completion time ΔT may be recorded as the number of times of deemed completion, when the number of times of deemed completion is equal or less than a prescribed cumulative number of times, the regeneration end processing based on the corrected regeneration completion pressure difference value PC may be executed, when the number of times of deemed completion exceeds the prescribed cumulative number of times, the regeneration end processing based on the corrected regeneration completion pressure difference value PC may be stopped. In this case, the number of times of deemed completion represents the number of times of generation of abrasion powder accumulated and measured after the vehicle starts to be used, and the number of times of generation of abrasion powder represents the number of times of contact between the exhaust side impeller 11 and the exhaust side housing 12. That is, as the number of times of contact between the exhaust side impeller 11 and the exhaust side housing 12 increases, the amount of generation of abrasion powder decreases, and if the number of times of contact exceeds a given number of times, abrasion powder is not generated. Accordingly, in this modification example, the regeneration end processing based on the corrected regeneration completion pressure difference value PC is stopped at this time. The prescribed number of times with respect to the number of times of deemed completion is, for example, three times.

In this way, in this modification example, the number of times in which the time for which the pressure difference value ΔP/Ga decreases to the corrected regeneration completion pressure difference value PC and is then maintained to be equal to or greater than the basic regeneration completion pressure difference value PB after the regeneration processing starts exceeds the regeneration completion time ΔT is recorded as the number of times of deemed completion, and when the time pressure difference value ΔP/Ga decreases to the corrected regeneration completion pressure difference value PC and is then maintained to be equal to or greater than the basic regeneration completion pressure difference value PB after the regeneration processing starts exceeds the regeneration completion time ΔT, the regeneration processing ends only when the number of times of deemed completion is equal to or less than the prescribed number of times.

What is claimed is:

1. An exhaust gas control apparatus for an internal combustion engine, the exhaust gas control apparatus comprising:
   a particulate filter configured to trap particulates in exhaust gas;
   a regeneration processing device configured to perform regeneration processing for eliminating the particulates trapped on the particulate filter;
   a pressure difference sensor configured to acquire a pressure difference between an upstream and a downstream of the particulate filter; and
   an electronic control unit configured to
   i) obtain a first pressure difference value representing an amount of deposits deposited in the particulate filter based on the pressure difference,
   ii) set a second pressure difference value representing an end time of the regeneration processing based on a predicted deposition amount of incombustible deposits produced steadily on the particulate filter,
   iii) set a third pressure difference value, which is higher than the second pressure difference value and represents an end time of the regeneration processing, based on a deposition amount of incombustible deposits deposited unsteadily on the particulate filter,
   iv) when the first pressure difference value decreases to the second difference value before a prescribed time elapses after the first pressure difference value decreases to the third pressure difference value during the regeneration processing by the regeneration processing device, end the regeneration processing, and
   v) when a time for which the first pressure difference value is maintained to be equal to or greater than the second pressure difference value exceeds the prescribed time after the first pressure difference value decreases to the third pressure difference value during the regeneration processing by the regeneration processing device, end the regeneration processing.

2. The exhaust gas control apparatus according to claim 1, wherein
   the electronic control unit is configured to, when the time for which the first pressure difference value is maintained to be equal to or greater than the second pressure difference value exceeds the prescribed time after the first pressure difference value decreases to the third pressure difference value and then the regeneration processing ends, reset the second pressure difference value and the third pressure difference value for next regeneration processing based on a difference between the second pressure difference value and the first pressure difference value at which the regeneration processing ends.

3. The exhaust gas control apparatus according to claim 1, wherein
the electronic control unit is configured to set the third pressure difference value such that the third pressure difference value becomes a value equal to or greater than a sum of a fourth pressure difference value that increases when abrasion powder discharged from a turbocharger provided in an engine exhaust system is deposited in the particulate filter and the second pressure difference value.

4. The exhaust gas control apparatus according to claim 3, wherein
the electronic control unit is configured to store a total traveling distance of a vehicle at which the abrasion powder is not discharged from the turbocharger as a predetermined distance, and
the electronic control unit is configured to, when the time for which the first pressure difference value is maintained to be equal to or greater than the second pressure difference value exceeds the prescribed time after the first pressure difference value decreases to the third pressure difference value during the regeneration processing, end the regeneration processing only when the total traveling distance of the vehicle is equal to or greater than the predetermined distance.

5. The exhaust gas control apparatus according to claim 1, wherein
the electronic control unit is configured to record a cumulative number of times in which the time for which the first pressure difference value is maintained to be equal to or greater than the second pressure difference value exceeds the prescribed time after the first pressure difference value decreases to the third pressure difference value during the regeneration processing, and
the electronic control unit is configured to, when the time for which the first pressure difference value is maintained to be equal to or greater than the second pressure difference value exceeds the prescribed time after the first pressure difference value decreases to the third pressure difference value during the regeneration processing, end the regeneration processing only when the cumulative number of times is equal to or smaller that a prescribed cumulative number of times.

6. The exhaust gas control apparatus according to claim 1, wherein
the regeneration processing device is configured to perform the regeneration processing by performing post injection from a fuel injection valve,
the electronic control unit is configured to set a regeneration interruption time for suppressing mixing of fuel in engine oil with the post injection, and
the electronic control unit is configured to end the regeneration processing when an elapsed time after the regeneration processing starts becomes equal to or longer than the regeneration interruption time.

* * * * *